United States Patent
Cooper

[15] 3,696,787
[45] Oct. 10, 1972

[54] ARTIFICIAL RUMEN STIMULATOR

[72] Inventor: Cecil D. Cooper, 20161 Glendale Avenue, Lemoore, Calif. 93245

[22] Filed: June 24, 1971

[21] Appl. No.: 156,404

[52] U.S. Cl. .........................................119/1, 119/51
[51] Int. Cl. ...............................................A01k 67/00
[58] Field of Search......................................119/1, 51

[56] References Cited

UNITED STATES PATENTS

| | | | |
|---|---|---|---|
| 3,415,225 | 12/1968 | Collier | 119/1 |
| 3,548,785 | 12/1970 | Cooper | 119/1 |
| 3,152,573 | 10/1934 | Kusaka | 119/51 X |

*Primary Examiner*—Medbery, Aldrich F.
*Attorney*—Huebner & Worrel

[57] ABSTRACT

An artificial rumen stimulator for ruminant animals which utilizes a hollow body formed of two telescopically and initially relatively rotatable portions rigidly affixed in adjusted and fluid-tight association, elongated tenacles integral with opposite ends of the body resiliently urged outwardly to radially disposed positions, and a fluid-releasable tube confining the tenacles in folded positions extended longitudinally along the body with the tenacles of the opposite ends of the body being in interlaced relation.

8 Claims, 6 Drawing Figures

PATENTED OCT 10 1972 3,696,787

CECIL D. COOPER
INVENTOR

Huebner & Worrel
ATTORNEYS

ARTIFICIAL RUMEN STIMULATOR

BACKGROUND OF THE INVENTION

The present invention relates to an artificial rumen stimulator of the general type shown and described in U.S. Pat. No. 3,548,785 issued Dec. 22, 1970 and more particularly to an improved form thereof which is simpler and more economical to construct, more effectively ingested into the rumen, and of increased dependability.

It is well known that ruminant animals are able to digest large quantities of low quality feeds by ingesting it with little chewing into the largest of four stomachs, called the rumen. The rumen is not a true stomach inasmuch as it contains no digestive glands. It is more in the nature of a pre-treating storage compartment having mixing facilities. It contains a high concentration of bacteria which serves to break up the more complex cellulose components preliminary to subsequent digestion. The feed is regurgitated by the animal after pretreatment in the rumen and masticated into finer particles which are more easily digested by the enzymes of the true stomach and intestines. For mixing purposes, the rumen rhythmically contracts and relaxes, such contraction additionally serves to facilitate regurgitation. The continual mixing and movement of the feed serves to prevent excessive fermentation, bloating and autointoxication. The rhythmic contractions are instigated by the engagement of the rough feed against the inside walls of the rumen.

As feed for ruminants has been progressively refined to achieve optimum feed-to-meat and feed-to-milk conversion ratios, such feeds have failed to stimulate the rumen into desired activity resulting in inadequate food assimilation, bloat, and other difficulties. Thus, ruminants have suffered from the utilization of overly refined feeds and the objectives of such feeds have thus not been properly attained.

Various efforts have been made artificially to stimulate the activity of the rumen in order to accommodate the refined feeds. The invention of my U.S. Pat. No. 3,548,785 resulted from such an effort. While the artificial rumen stimulator of the patent has proved highly effective, in some instances it has been subject to certain difficulties which the present invention has overcome. In rare but objectionable instances, the stimulator of the patent has failed properly to reach the rumen. Such instances have resulted from two causes. In instances which the stimulator has been unable to float in the animal's digestive fluids, the stimulator has lodged in the animal's reticulum and never reached the rumen. Of course, artificial agitation of the reticulum achieves no beneficial result and under such conditions the rumen has not been stimulated. In other instances, the encapsulating housing or capsule of the stimulator has dissolved too rapidly and released the stimulator to its expanded position prematurely, precluding its passage into the rumen.

Further, it has been desirable to produce the stimulator more economically and to achieve for the more economical stimulator, more effective operation.

SUMMARY OF THE INVENTION

It has therefore been an object of the present invention to provide an improved artificial rumen stimulator of the general character shown and described in my U.S. Pat. No. 3,548,785 but having improved operational characteristics and production economies and conveniences.

Another object is to provide an artificial rumen stimulator which is sufficiently buoyant to attain dependable floating action during ingestion and utilization in the rumen.

Another object is to provide such an artificial rumen stimulator which is releasable to expanded operable position and in which such release is absolutely dependable but is somewhat more slowly achieved in order to insure passage into the rumen before expansion.

Another object is to provide an artificial rumen stimulator which is easier to produce.

Another object is to provide an artificial rumen stimulator which is more economical.

A further object is to provide an artificial rumen stimulator of improved action.

Still further objects and advantages will become apparent in the subsequent description in the specification.

DESCRIPTION OF THE PREFERRED EMBODIMENT

Referring in greater detail to the drawings, it is necessary to have the stimulator, illustrated generally at 10, reach the rumen 11 when ingested by a ruminant 12. To this end, the stimulating portions of the stimulator, to which detailed reference will subsequently be made, are tightly confined in a tube 13 adapted to release such portions when the stimulator reaches the rumen. The tube preferably has open opposite ends to permit the juices of the rumen to reach the interior thereof and is of spirally wound paper or fiberboard with adjacent convolutions thereof adhesively secured by an adhesive which is soluble in such juices. The tube will be recognized as being of well-known construction and thus is not described in greater detail. While it is preferably cylindrical, it will be evident that it can also be of polygonal, oval or other transverse configuration and operate in the same manner.

Figure 5:
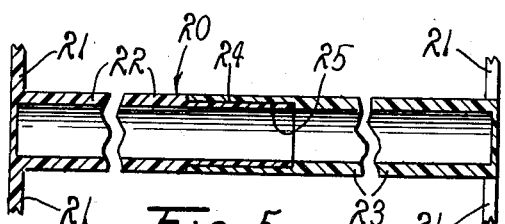
FIG. 5 is a somewhat enlarged but fore-shortened section taken on line 5—5 of FIG. 4.
Figure 4:
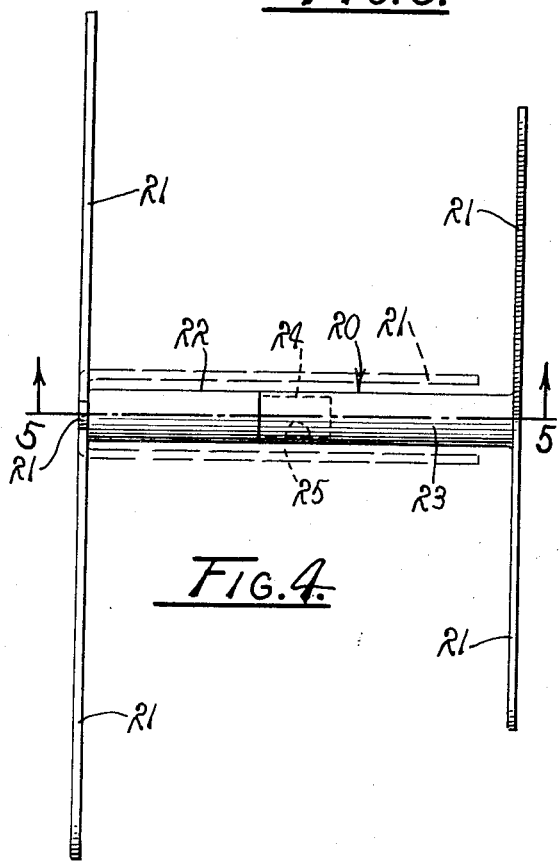
FIG. 4 is a side elevation of the rumen stimulator of the present invention as it appears after ingestion into the rumen of a ruminant and released from its holding tube. The stimulator has tenacles shown in folded compact position in dashed line, as they are constrained during ingestion, and full line in operable position subsequent to release.
Figure 6:
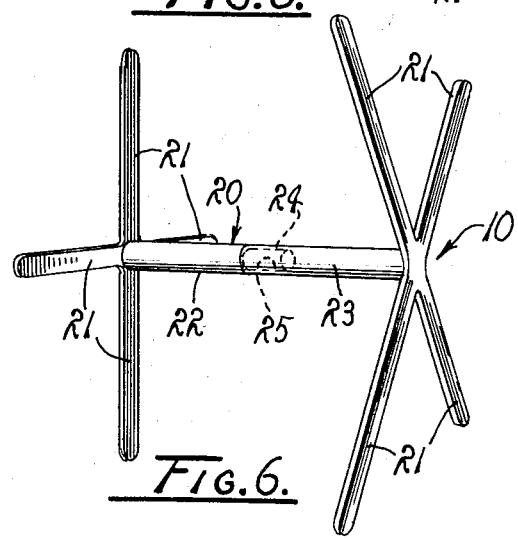
FIG. 6 is a perspective of the stimulator shown in FIG. 4.

Confined within the tube 13 is a hollow tubular buoyant body 20 having opposite ends from which a plurality of tenacles 21 extend. The body has opposite end portions 22 and 23 which are cast or die stamped from any suitable plastic as integral units with their respective tenacles. Each portion has an open inner end. As best shown in FIGS. 4, 5 and 6, the portion 22 of the body has an inner end which is of reduced diameter at 24 and the portion 23 has an inner end which is counterbored at 25. The portions 22 and 23 can be formed in the same mold or die with appropriate coring, not shown, to form the reduction 24 and counterbore 25. When the reduction 24 is inserted telescopically into the counterbore 25, the portions 22 and 23 are relatively rotationally positionable. The tenacles 21 are resiliently urged into radially extended position but possess sufficient flexibility to be folded substantially flatly against the body 20 in extension longitudinally thereof. Although any desired number of tenacles may be utilized, four at each end of the body 22 are excellently suited to the purpose. To achieve the maximum compact folding of the tenacles, they are preferably provided in right angular relation at each end of the body and the portions 22 and 23 rotationally positioned so that the angles formed by the tenacles at one end are bisected by the tenacles at the opposite end. In such relationship, the tenacles are interlaced when folded along the body and are of such width as to accommodate such disposition along the body without interference. When the portions 22 and 23 have been telescopically associated and properly rotationally positioned, they are secured in fluid-tight fixed relation. This is achieved by depositing a small amount of solvent for the plastic between the portions 24 and 25 before they are telescopically associated and then permitting the thin layer of dissolved plastic to harden. The extended ends of the tenacles 21 may be pointed or sharpened, if desired, but the round shape shown in the drawings is suitable to the attainment of desired stimulation without excessive irritation.

OPERATION

The operation of the described embodiment of the present invention is believed to be clearly apparent and is briefly summarized at this point. The ruminant 12 is caused to ingest the stimulator 10 with the tenacles 21 held along the body 20 in confinement by the tube 13. The stimulator may be of any desired size but it has been found quite convenient to effect such ingestion when the overall length of the stimulator is approximately 5 inches and the diameter is 1 inch. The materials from which the stimulator is made and the volume of the hollow interior of the body 20 are so designed that the stimulator possesses a specific gravity of 0.8 or less to insure initial and continuous flotation in the gastric juices found in the reticulum and rumen of the ruminant.

As the stimulator 10 floats on such juices, they start to dissolve the adhesive which binds the convolutions of the tube 13 in housing relation to the tenacles 21 and body 20 but the dissolving action is sufficiently slowly accomplished that the stimulator reaches the rumen 11 before the convolutions are released.

Figure 1:
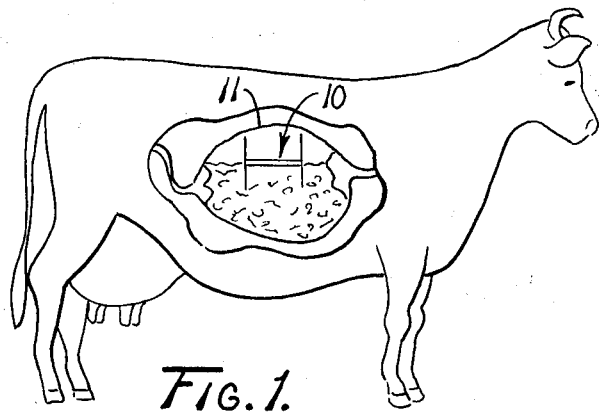
FIG. 1 is a side view of a ruminant having a portion of a side thereof removed to illustrate a rumen having a device of the present invention disposed therein in operable position.
Figure 2:
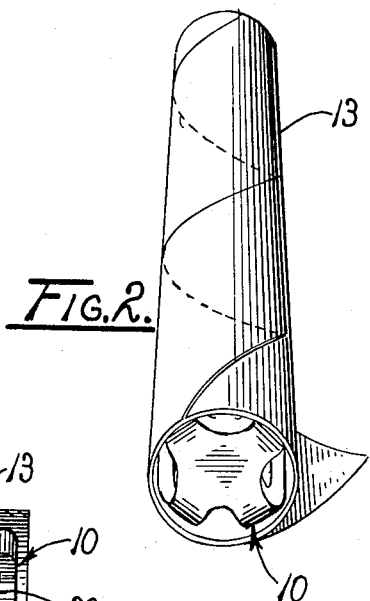
FIG. 2 is a perspective of the rumen stimulator of the present invention substantially as it is ingested except for a partial unwrapping of a convolution of a holding tube utilized to insure compact encapsulation during ingestion.
Figure 3:
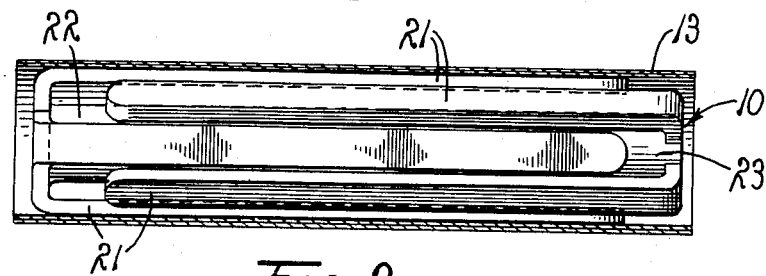
FIG. 3 is a longitudinal section of the rumen stimulator taken on line 3—3 of FIG. 2.

As the adhesive slowly dissolves, the outer convolutions start to unwrap, as illustrated in FIG. 2. The tenacles 21 held under compression in their folded positions, shown in FIG. 3, press outwardly against the convolutions and aid in such unwrapping action. After the paper or fiberboard of the tube has unwrapped, it is regurgitated by the ruminant and subsequently eliminated.

As shown as the convolutions of the tube 13 release the tenacles 21, they gradually move outwardly into their radially extended positions. While in floating position, the upwardly extended tenacles 23 stimulate the vagus nerve receptors of the rumen to initiate the rumination process. Such stimulation simulates that normally produced by rough forage normally ingested by ruminants.

As described in my above designated patent, the rumen contractions produced by the artificial stimulation of the rumen initiate an intricate series of active digestive processes. These include regurgitation of the food into the mouth, remastication of the food, and the return of such remasticated food into the stomach system. The stimulation also causes the belching of gases produced within the rumen so as to preclude bloat, autointoxication and the like. The relatively constant stimulation achieved substantially increases the amount of time that the animal spends ruminating so that even refined foods are effectively, thoroughly and rapidly processed. The result is a substantial increase in the ruminant's metabolic rate which effectively improves the feed-to-meat and feed-to-milk conversion ratios.

Additionally, the artificial rumen stimulator 10 of the present invention has proved highly effective in the avoidance of certain diseases in ruminants such as enterotoxemia in lambs, caused by overeating and the toxins produced by the bacteria *Clostridium perfringens*, and a similar disease in bovine ruminants caused by *Clostridium sordelli* which are known to produce toxic substances when rumination is insufficient or ineffective.

Further, the utilization of the stimulator 10 of the present invention permits the feeding of low cost waste by-products which do not in themselves contain sufficient roughage but which do have food value not previously fully available to ruminants.

Still further, it has been known that young ruminants require rough feed in order to initiate development of their rumens. The artificial rumen stimulator of the present invention has been used as a substitute for such roughage and has proved itself highly effective in stimulating rumen development.

As compared with its predecessor, the stimulator 10 is more economical and convenient to produce. The hollow tubular body 20 insures dependable flotation. The tube 13 which houses the body 20 and tenacles 21 insures dependable encapsulation and certain release after desired delay. These two features insure that the stimulator reaches the rumen before release of the tenacles 21. The relative angular disposition of the tenacles at the opposite ends of the body also insures more effective engagement with the walls of the rumen than when the corresponding tenacles at opposite ends of the body are disposed in common planes radial to the body.

Although the invention has been herein shown and described in what is conceived to be the most practical and preferred embodiment, it is recognized that depar- Having described my invention, what I claim as new and desire to secure by Letters Patent is:

1. An artificial rumen stimulator for ruminant animals comprising an elongated buoyant tubular body having opposite ends, and a plurality of elongated foldable tenacles integral with opposite ends of the body and radially outwardly extended therefrom, the tenacles at each end of the body being spaced circumferentially thereabout at different positions on the body so the tenacles at one end of the body are intermediate the tenacles at the other end of the body so that the tenacles can be folded longitudinally along the body in non-interfering interlaced relation with each other.

2. The rumen stimulator of claim 1 in which the body comprises telescopically associated opposite end portions.

3. The rumen stimulator of claim 2 in which the opposite end portions of the body with their respective tenacles are substantially identical and suitable for formation in the same mold or die.

4. The rumen stimulator of claim 2 in which the end portions are relatively rotationally positionable when initially telescopically associated so that the tenacles can be oriented for said non-interfering interlaced association and the telescopically associated portions are bonded in fixed rotational relation.

5. An artificial rumen stimulator for ruminant animals comprising an elongated hollow body having opposite ends; a plurality of elongated tenacles integral with opposite ends of the body folded substantially flatly against the body in longitudinal extension therealong, the tenacles at each end of the body being spaced circumferentially thereabout at different positions and the tenacles one end of the body being intermediate the tenacles at the other end of the body so that the folded tenacles are in non-interfering interfitted relation with each other said tenacles being resiliently urged into radially extended position; and a spirally wound tube having open opposite ends housing the body and tenacles releasably holding the tenacles in folded positions, the tube having convolutions releasably held in tubular association by an adhesive which is soluble in the gastric juices of ruminant animals whereby upon ingestion the adhesive gradually releases the convolutions which in turn release the tenacles for radial extension to stimulate the rumen.

6. The stimulator of claim 5 in which the body is a hollow tubular member comprising telescopically interconnected opposite ends.

7. The stimulator of claim 5 having a specific gravity of 0.8 or less in which the opposite ends with their respective tenacles are substantially identical, are relatively rotationally positionable when initially telescopically associated so that the tenacles can be positioned for interlaced association, and the telescopically associated portions of the body are bonded in fixed relation.

8. The stimulator of claim 5 in which the tube, body and tenacles are substantially the same length so that the ends of the tenacles bear outwardly against the ends of the tube opposite to the end of the body with which they are integral and in which the tenacles are urged to their radial disposition with a force sufficient to aid the convolutions in unwinding therefrom as the adhesive dissolves.

* * * * *